United States Patent
Eberhart et al.

(10) Patent No.: US 7,441,475 B2
(45) Date of Patent: Oct. 28, 2008

(54) RACK-AND-PINION STEERING SYSTEM, IN PARTICULAR FOR LIGHT COMMERCIAL VEHICLES

(75) Inventors: Eugen Eberhart, Duesseldorf (DE); Johannes Hullmann, Kaarst (DE); Gregor Watzlawek, Duesseldorf (DE)

(73) Assignee: TRW Automotive GmbH (DE)

( * ) Notice: Subject to any disclaimer, the term of this patent is extended or adjusted under 35 U.S.C. 154(b) by 0 days.

(21) Appl. No.: 11/497,795

(22) Filed: Aug. 2, 2006

(65) Prior Publication Data

US 2007/0039773 A1    Feb. 22, 2007

Related U.S. Application Data

(63) Continuation of application No. PCT/EP2005/001158, filed on Feb. 4, 2005.

(30) Foreign Application Priority Data

Feb. 5, 2004   (DE) .................. 20 2004 001 740 U

(51) Int. Cl.
*F16H 35/06* (2006.01)

(52) U.S. Cl. ................ 74/388 PS; 74/422; 74/89.11; 180/444; 280/93.515

(58) Field of Classification Search ............. 74/388 PS, 74/422, 89.11, 109; 180/444, 400; 280/93.514, 280/93.515
See application file for complete search history.

(56) References Cited

U.S. PATENT DOCUMENTS

| 3,709,099 | A | | 1/1973 | Dumeah | |
|---|---|---|---|---|---|
| 3,800,407 | A | | 4/1974 | Dumeah | |
| 4,172,507 | A | | 10/1979 | Millard | |
| 4,479,400 | A | | 10/1984 | Rieger | |
| 4,865,149 | A | * | 9/1989 | Rohrbach et al. | 180/400 |
| 4,887,683 | A | * | 12/1989 | Klosterhaus et al. | 180/428 |
| 5,040,631 | A | | 8/1991 | Lang et al. | |
| 6,273,210 | B1 | * | 8/2001 | Saito et al. | 180/444 |
| 6,408,976 | B1 | * | 6/2002 | Saito et al. | 180/428 |
| 6,457,375 | B1 | | 10/2002 | Buch | |
| 2006/0201735 | A1 | * | 9/2006 | Williams et al. | 180/428 |
| 2006/0225945 | A1 | * | 10/2006 | Williams | 180/432 |

FOREIGN PATENT DOCUMENTS

| DE | 2 114 591 | | 2/1972 |
|---|---|---|---|
| DE | 31 18 254 | A1 | 11/1982 |
| DE | 31 18 254 | C2 | 6/1986 |
| DE | 28 09 781 | C2 | 2/1987 |
| DE | 198 22 313 | A1 | 11/1998 |
| DE | 103 36 628 | A1 | 3/2005 |
| DE | 103 57 014 | A1 | 6/2005 |
| EP | 0 176 394 | A1 | 4/1986 |
| FR | 2643602 | | 8/1990 |

* cited by examiner

*Primary Examiner*—David M Fenstermacher
(74) *Attorney, Agent, or Firm*—MacMillan, Sobanski & Todd, LLC

(57) ABSTRACT

A rack-and-pinion steering system, in particular for lighter commercial vehicles, has a housing, a toothed rack, a driven element and a servo unit. The driven element is arranged between the toothed rack and the servo unit.

17 Claims, 2 Drawing Sheets

RACK-AND-PINION STEERING SYSTEM, IN PARTICULAR FOR LIGHT COMMERCIAL VEHICLES

CROSS-REFERENCE TO RELATED APPLICATIONS

This application is a continuation of International Application No. PCT/EP2005/001158 filed Feb. 4, 2005, the disclosures of which are incorporated herein by reference in entirety, and which claimed priority to German Patent Application No. DE 20 2004 001 740.7 filed Feb. 5, 2004, the disclosures of which are incorporated herein by reference in entirety.

BACKGROUND OF THE INVENTION

The invention relates to a rack-and-pinion steering system, in particular for lighter commercial vehicles, comprising a housing, a toothed rack, a driven element and a servo unit.

For economical reasons the use of rack-and-pinion steering systems has meanwhile been pushed ahead in commercial vehicles having a partial load on the front axle of up to approx. 6 tons. In so doing, the problem arises that on account of the high tooth rack forces of up to 60 kN and the large stroke of up to more than 125 mm special loads act on the toothed rack.

BRIEF SUMMARY OF THE INVENTION

A feature of the invention is to provide a steering system which is capable of withstanding the loads but at the same time cheap regarding the manufacturing costs.

In order to achieve this feature, the invention provides a rack-and-pinion steering system, in particular for lighter commercial vehicles, comprising a housing, a toothed rack, a driven element and a servo unit. The driven element is arranged between the toothed rack and the servo unit. Such a so-called mid-tapped rack-and-pinion steering has proved to be particularly advantageous in the case of the high loads occurring, in particular because a symmetrical or at least near symmetrical construction may be achieved.

In accordance with a preferred embodiment of the invention it is provided for that the driven element is a sliding block arranged in the housing. Such a sliding block may be used to pass the transverse forces occurring directly into the housing so that a toothed rack having smaller dimensions may be used. If the developing transverse forces were directly transferred to the toothed rack, the latter would have to be dimensioned considerably larger, in particular with a larger diameter, in order to be able to resist the loads occurring. However, a toothed rack dimensioned to be so large would result in considerable costs and a very high weight of the rack-and-pinion steering.

In accordance with a preferred embodiment of the invention it is also provided for that the housing comprises a pair of expansion bellows closing off the housing at the end at which the toothed rack is arranged. In this manner the housing proper may be configured to be considerably shorter than usually, which results in a higher degree of freedom with regard to the arrangement of the rack-and-pinion steering. There is in particular not the risk of the housing protruding into the space in which one of the steerable vehicle wheels can pivot into.

Other advantages of this invention will become apparent to those skilled in the art from the following detailed description of the preferred embodiment, when read in light of the accompanying drawings.

DETAILED DESCRIPTION OF THE INVENTION

Figure 1:
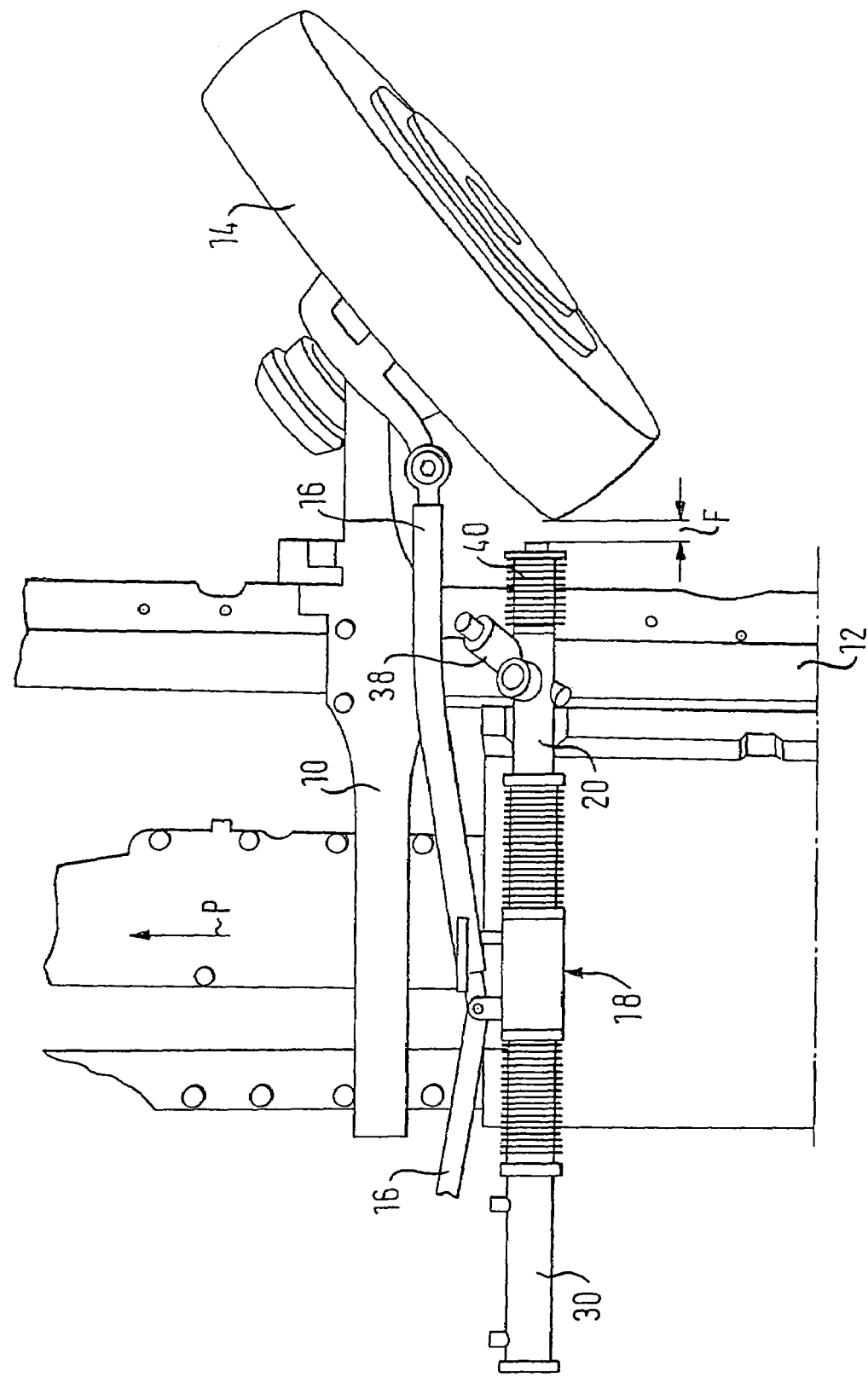
FIG. 1 shows a bottom view of a steering system in accordance with the invention.

FIG. 1 shows a front axle 10 of a commercial vehicle of which a frame 12 is shown in this arrangement as essential component. At the front axle 10 there is mounted a steerable vehicle wheel 14 which is connected via a tie rod 16 to a rack-and-pinion steering 18. The rack-and-pinion steering 18 is firmly mounted relative to the frame 12. The driving direction is indicated with the arrow P.

Figure 2:
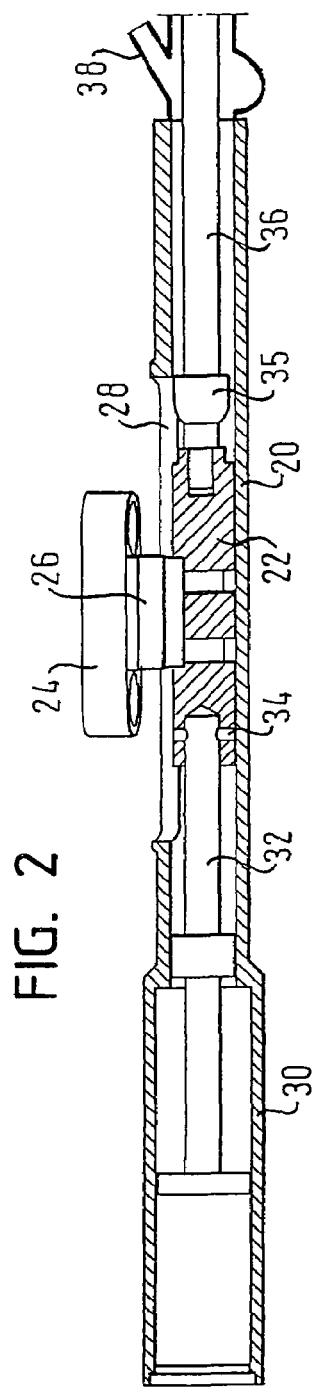
FIG. 2 shows a schematic section through the housing of the steering system of FIG. 1.
Figure 3:
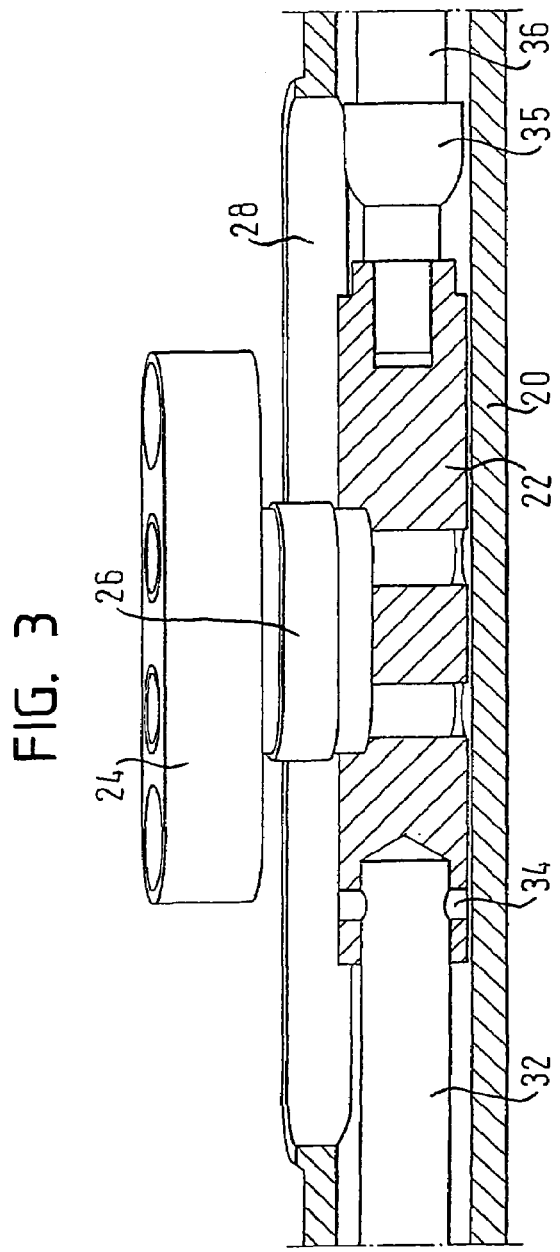
FIG. 3 shows an enlarged detail of FIG. 2.

The rack-and-pinion steering 18 (see FIG. 2) comprises a housing 20 in which a sliding block 22 is arranged so as to be movable in translation. With the sliding block 22 there is connected a connecting element 24 to which the two tie rods 16 are attached. The connecting element 24 comprises a bearing section 26 resting against two supporting surfaces 28 which are configured as the edges of a slot in the housing 20. The bearing section 26 is configured as a plain bearing so that it slides with low friction at the supporting surfaces 28.

At the left end of the housing 20 referring to FIG. 1 there is arranged a servo unit 30 which is designed as a hydraulic cylinder. The hydraulic cylinder comprises a piston rod 32 which is connected via a pin arrangement 34 to the sliding block 22.

On the side of the sliding block 22 opposite to the servo unit 30 there is arranged a toothed rack 36 which is connected via a ball-and-socket joint 35 to the sliding block 22. A pinion (not shown) engages the toothed rack 36, this pinion being arranged in a gearbox housing 38. The pinion is connected to the steering wheel of the vehicle.

On the side of the steering gear 38 the housing 20 is constructed so as to be shorter than would be necessary for accommodating the toothed rack 36 in each of its positions. The end of the housing is formed by a pair of expansion bellows 40 mounted at the housing and moved by the toothed rack by the end face of the toothed rack to the right, if the latter is shifted to the right referring to FIG. 1. When the toothed rack is again shifted to the left, the expansion bellows 40 automatically return to the left on account of the fixation at the toothed rack. Thus, the expansion bellows 40 may be considered a variable part of the housing 20 which only assumes large dimensions, if required. In this manner it is ensured that with a complete lock of the wheel 14 for a left turn, there is a clearance F between the wheel and the end of the housing 20.

The rack-and-pinion steering described offers the following advantages: On account of the arrangement of the sliding block centrally between the two vehicle wheels a symmetrical arrangement of the two tie rods 16 is achieved. All tilting forces transferred by the two tie rods via the connecting element 24 to the steering are passed into the latter via the bearing section 26 of the connecting element 24 and the supporting surface 28 of the housing 20. In this manner these forces are prevented from acting onto the toothed rack 36, the dimensioning of which has thus only to be effected substantially in view of the loads acting in longitudinal direction. The use of the ball-and-socket joint 35 for connecting the toothed rack 36 to the sliding block 22 additionally ensures that the toothed rack is not acted upon with transverse forces. The use of the expansion bellows results in a particularly compact rack-and-pinion steering so that there is a high degree of freedom in the arrangement of the rack-and-pinion steering at the vehicle.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. A rack-and-pinion steering system adapted for use with commercial vehicles, comprising a housing, a toothed rack, a driven element and a servo unit, said driven element being arranged between said toothed rack and said servo unit, wherein said driven element is a sliding block arranged in said housing and wherein said sliding block is connected via an articulated connection to said toothed rack.

2. The rack-and-pinion steering system of claim 1 wherein said sliding block is connected to a connecting element which is arranged outside said housing.

3. The rack-and-pinion steering system of claim 2 wherein said housing is provided with at least one supporting surface, said connecting element being provided with a bearing section resting against said supporting surface so as to support tilting forces.

4. The rack-and-pinion steering system of claim 2 wherein two tie rods are provided which are attached to said connecting element.

5. The rack-and-pinion steering system of claim 1 wherein said housing comprises a pair of expansion bellows closing off said housing at an end at which said toothed rack is arranged.

6. The rack-and-pinion steering system of claim 1 wherein said servo unit is a hydraulic positioning cylinder.

7. The rack-and-pinion steering system of claim 1 wherein said articulated connection is a ball joint.

8. A rack-and-pinion steering system adapted for use with commercial vehicles, comprising a housing, a toothed rack, a sliding block and a servo unit, said sliding block being arranged between said toothed rack and said servo unit, wherein said sliding block is arranged in said housing and said sliding block is connected via a ball joint to said toothed rack.

9. The rack-and-pinion steering system of claim 8 wherein said sliding block is connected to a connecting element which is arranged outside said housing.

10. The rack-and-pinion steering system of claim 9 wherein said housing is provided with at least one supporting surface, said connecting element being provided with a bearing section resting against said supporting surface so as to support tilting forces.

11. The rack-and-pinion steering system of claim 9 wherein two tie rods are provided which are attached to said connecting element.

12. The rack-and-pinion steering system of claim 8 wherein said housing comprises a pair of expansion bellows closing off said housing at an end at which said toothed rack is arranged.

13. The rack-and-pinion steering system of claim 8 wherein said servo unit is a hydraulic positioning cylinder.

14. A rack-and-pinion steering system adapted for use with commercial vehicles, comprising a housing, a toothed rack, a sliding block and a servo unit, said sliding block being arranged between said toothed rack and said servo unit, wherein said sliding block is arranged in said housing and said sliding block is connected via a ball joint to said toothed rack, wherein said sliding block is connected to a connecting element which is arranged outside said housing, and wherein said servo unit is a hydraulic positioning cylinder.

15. The rack-and-pinion steering system of claim 14 wherein said housing is provided with at least one supporting surface, said connecting element being provided with a bearing section resting against said supporting surface so as to support tilting forces.

16. The rack-and-pinion steering system of claim 14 wherein two tie rods are provided which are attached to said connecting element.

17. The rack-and-pinion steering system of claim 14 wherein said housing comprises a pair of expansion bellows closing off said housing at an end at which said toothed rack is arranged.

* * * * *